(12) United States Patent
Pang et al.

(10) Patent No.: US 6,671,373 B1
(45) Date of Patent: Dec. 30, 2003

(54) METHOD AND APPARATUS FOR DC FEED CONTROL

(75) Inventors: Liguang Pang, Austin, TX (US); Yan Zhou, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/420,713

(22) Filed: Oct. 20, 1999

(51) Int. Cl.[7] .............................................. H04M 19/00
(52) U.S. Cl. .................... 379/399.01; 379/413; 379/377
(58) Field of Search ..................... 379/413, 399.01, 379/377, 385

(56) References Cited

U.S. PATENT DOCUMENTS

| | | | | |
|---|---|---|---|---|
| 3,914,556 A | * | 10/1975 | Frazee | 379/379 |
| 4,385,336 A | * | 5/1983 | Takeshita et al. | 379/413 |
| 5,583,934 A | | 12/1996 | Zhou | 379/399 |
| 5,619,567 A | * | 4/1997 | Apfel | 379/386 |
| 6,377,681 B1 | * | 4/2002 | Bremner | 379/413 |

FOREIGN PATENT DOCUMENTS

EP    0446944 A    9/1991

OTHER PUBLICATIONS

International Search Report dated Sep. 22, 2000 (PCT/US00/11057; TT3002–PCT).

* cited by examiner

*Primary Examiner*—Forester W. Isen
*Assistant Examiner*—Daniel Swerdlow
(74) *Attorney, Agent, or Firm*—Williams, Morgan & Amerson, P.C.

(57) ABSTRACT

A method and apparatus is provided for adjusting DC feed control of a connection. The method includes receiving a signal from the connection and determining if the change in the signal is greater than a first preselected value. The method further includes adjusting the DC feed in response to determining that the change in the signal is greater than the first preselected value.

23 Claims, 5 Drawing Sheets

METHOD AND APPARATUS FOR DC FEED CONTROL

BACKGROUND OF THE INVENTION

1. Field of the Invention

This invention relates generally to telecommunications, and, more particularly, to a method and apparatus for adjusting DC feed control to a subscriber loop.

2. Description of the Related Art

In communications systems, particularly telephony, it is common practice to transmit signals between a subscriber station and a central switching office via a two-wire bi-directional communication channel. A line card generally connects the subscriber station to the central switching office. The primary functions of the line card may include supplying talk battery, performing impedance matching, determining whether a telephonic equipment is on-hook or off-hook, and handling ringing signals, voice signals, and testing signals.

Subscriber line interface circuits generally include a switch-hook detection circuit that supervises telephone operation by detecting whether a telephone is either on-hook or off-hook. An "off-hook" condition occurs when an end user lifts the handset of a telephone from the cradle, thereby activating the telephone's hook switch. Conversely, an "on-hook" condition occurs when the handset is placed back in the telephone cradle, thereby terminating the telephone service. Upon detecting the on-hook or off-hook condition, the switch-hook information is passed to the system software of the line card, which then either provides or terminates service.

Upon requesting service, a user may establish a connection with a remote user by dialing the telephone number of that user. Telephone dialing may be in the form of dial pulses or tones. Pulse dialing includes generating of a series of electrical interrupts or pulses across the telephone line. One method of generating electrical pulses is by toggling between on-hook and off-hook states such that each transition from an on-hook to off-hook state represents one pulse. The number of pulses generated usually represent the digit that is dialed.

The off-hook/on-hook ratio (also referred to as make/break ratio) applied to the loop during pulse dialing is typically 40 to 60; that is, the loop is closed 40 percent of the time and is open 60 percent of the time. The break interval is generally allowed to vary from about 58 percent to 64 percent. However, because of the pulse distortion caused by the loop, the pulse receivers or detectors in the central office must be able to properly respond to a break interval of 55 percent to 65 percent.

A telephone system needs DC feed to control the battery feed to the subscriber loop. DC feed delivers enough power for long loop and gradually reduces the power for short loop. A digital signal processing algorithm controls the DC feed curve. During the transition from off-hook to on-hook, the loop impedance changes from low to high and the measured loop voltage between the tip and ring terminals goes from low to high. Generally, the DC feed control is slow to react to sudden changes in the loop impedance. As such, if the loop impedance is high enough during an off-hook to on-hook transition, the DC feed driver may be saturated. During saturation, the measured loop voltage between the tip and ring terminals and the flowing current may not accurately reflect the loop impedance, $Z_{LOOP}$, a parameter which is generally used for switch hook detection. Thus, an inaccurate measurement of the loop resistance may result in a false detection, thereby causing switch-hook distortion. Additionally, switch-hook distortion may also occur during pulse dialing because of capacitance and inductance present on the subscriber line.

The present invention is directed to overcoming, or at least reducing the effects of, one or more of the problems set forth above.

SUMMARY OF THE INVENTION

In one aspect of the present invention, a method is provided for adjusting DC feed control of a connection. The method includes receiving a signal from the connection and determining if the change in the signal is greater than a first preselected value. The method further includes adjusting the DC feed in response to determining that the change in the signal is greater than the first preselected value.

In another aspect of the present invention, an apparatus is provided for adjusting DC feed control of a connection. The apparatus includes means for receiving a signal from the connection and comparator logic adapted to determine if the change in the signal is greater than a first preselected value. The apparatus further includes means for adjusting the DC feed in response to determining that the change in the signal is greater than the first preselected value.

BRIEF DESCRIPTION OF THE DRAWINGS

The invention may be understood by reference to the following description taken in conjunction with the accompanying drawings, in which like reference numerals identify like elements, and in which.

Figure 1:
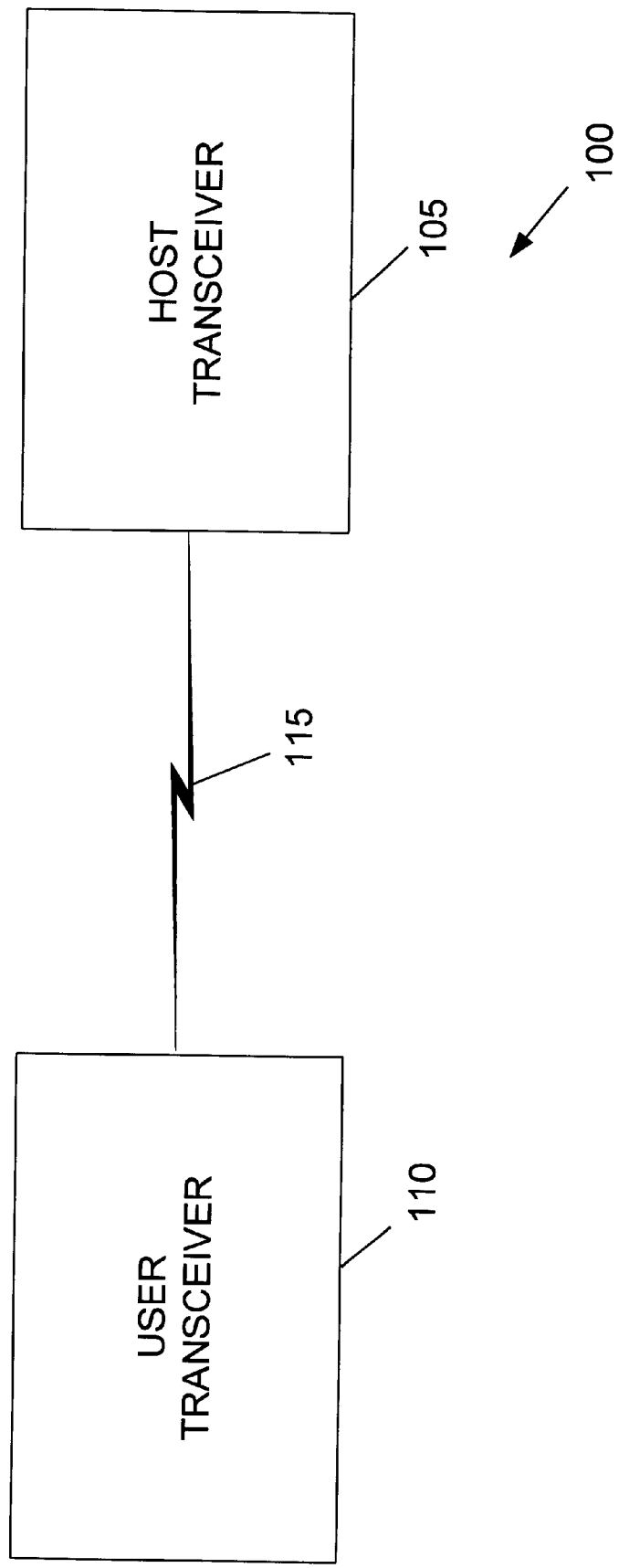
FIG. 1 illustrates a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, a communications system 100 in accordance with the present invention is illustrated. The communications system 100 includes a host transceiver 105 and a user transceiver 110 capable of communicating with each other over a connection 115. The connection 115 may be either a wire-line connection or a wireless connection, depending on the application. An example of a wire-line connection includes a subscriber line, which may comprise a Public Switched Telephone Network (PSTN) line, a Private Branch Exchange (PBX) line, or any other medium capable of transmitting signals.

The user transceiver 110 may be a telephonic device capable of supporting pulse dialing. The term "telephonic device," as utilized herein, includes a telephone, or any other device capable of providing a communication link between at least two users. In one embodiment, the user transceiver 110 may be one of a variety of available conventional telephones, such as cordless telephones, cellular telephones, wired telephones, and the like. In an alternative embodiment, the user transceiver 110 may be any "device" capable of performing a substantially equivalent function of a conventional telephone, which may include, but is not limited to, transmitting and/or receiving voice and data signals. Examples of the user transceiver 110 include a data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
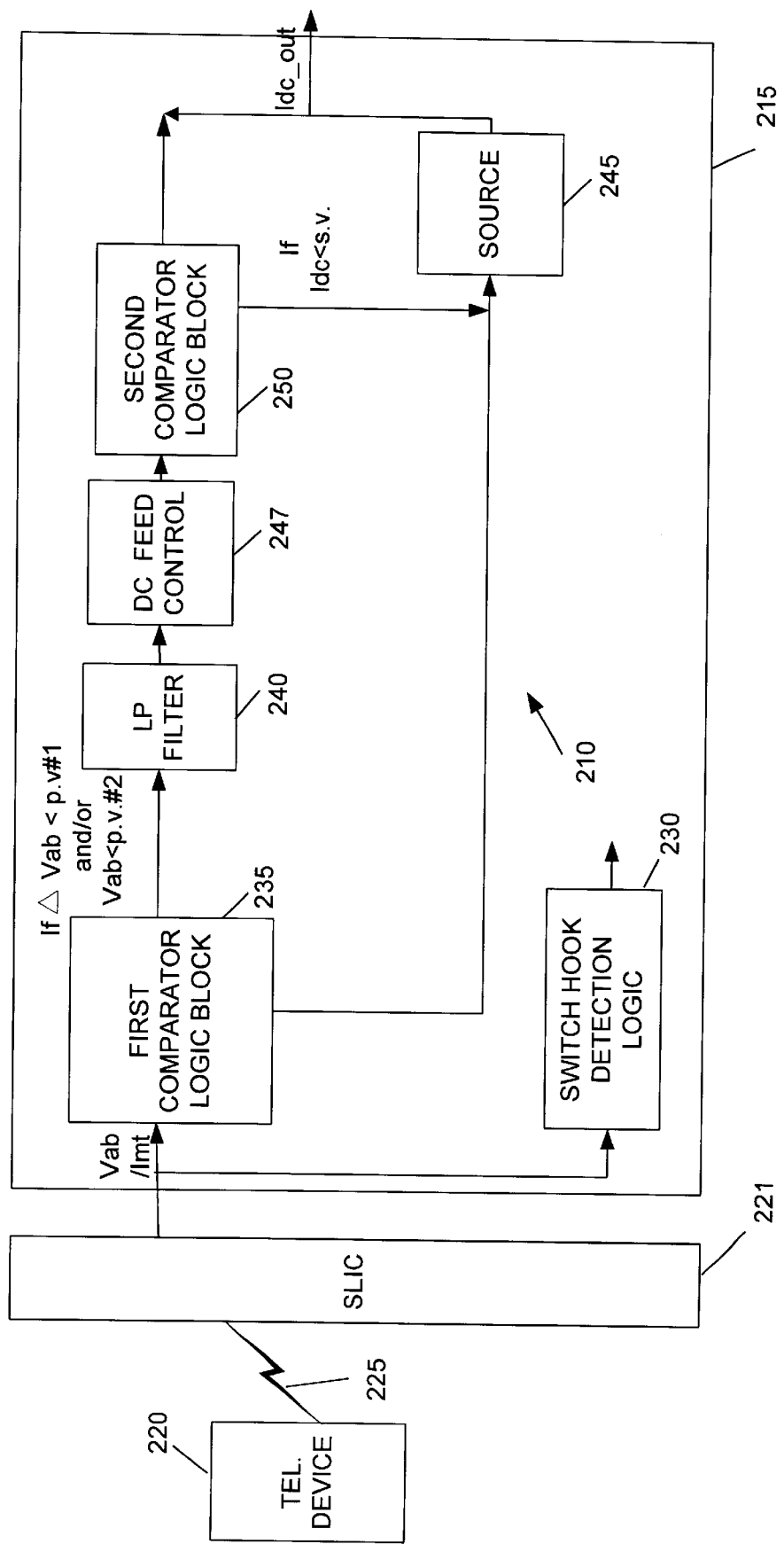
FIG. 2 depicts a block diagram of an embodiment of an apparatus in accordance with the present invention that may be implemented in the communications system of FIG. 1.

FIG. 2 illustrates an apparatus 210 in accordance with the present invention. In the illustrated embodiment, the host transceiver 105 is a subscriber line audio-processing circuit (SLAC) 215. Although not necessary, the apparatus 210 of the present invention is implemented within the SLAC 215. In the interest of clarity and to avoid obscuring the invention, only that portion of the SLAC 215 that is helpful to the understanding of the invention is illustrated. Furthermore, although not shown, those skilled in the art will appreciate that that SLAC 215 may have other components that provide functions analog-to-digital and digital-to-analog conversions, echo suppression, and the like.

The SLAC 215 is coupled to the user transceiver 110, which, in the illustrated embodiment, is a telephonic device 220. The SLAC 215 interfaces with the telephonic device 220 through a SLIC 221 by the connection 115, illustrated as a subscriber line 225 in the instant embodiment. Specifically, the connection 115 is a PSTN line that connects the SLAC 215, which may be located at a central office (CO), to the telephone device 220, which may be located at a customer premises (CP). The combination of the subscriber line 225 and the telephonic device 220 is commonly referred to as a subscriber loop. The SLIC 221 interfaces with the subscriber line 225 via tip and ring terminals (not shown). The SLIC 221, which generally includes a driver (not shown) for providing signals to the subscriber loop, may be capable of providing a variety of useful functions, such as battery feed, over-voltage protection, and ringing signal, for interfacing with the telephonic device 220.

The SLAC 215 includes a switch hook detection logic block 230 that is capable of detecting whether the telephonic device 220 is on-hook or off-hook based on the measured electrical parameters, $V_{ab}$ (voltage between tip and ring terminals) and $I_{mt}$ (metallic current). For example, the switch hook detection logic block 230 may use equation (1) below for setting a switch-hook threshold to ascertain the switch-hook state of the telephonic device 220.

$$V_{ab} < I_{mt} * T_{sh} + V_{mk}, \tag{1}$$

where $T_{sh}$ is programmable loop impedance and $V_{mk}$ is make-voltage parameter utilized to compensate for different phone sets. When $V_{ab}$ becomes less than $I_{mt} * T_{sh} + V_{mk}$, an off-hook is detected. Upon detecting the switch-hook state of the telephonic device 220, the switch hook detection logic block 230 provides the switch-hook information to the system software of the SLAC 215.

Figure 5:
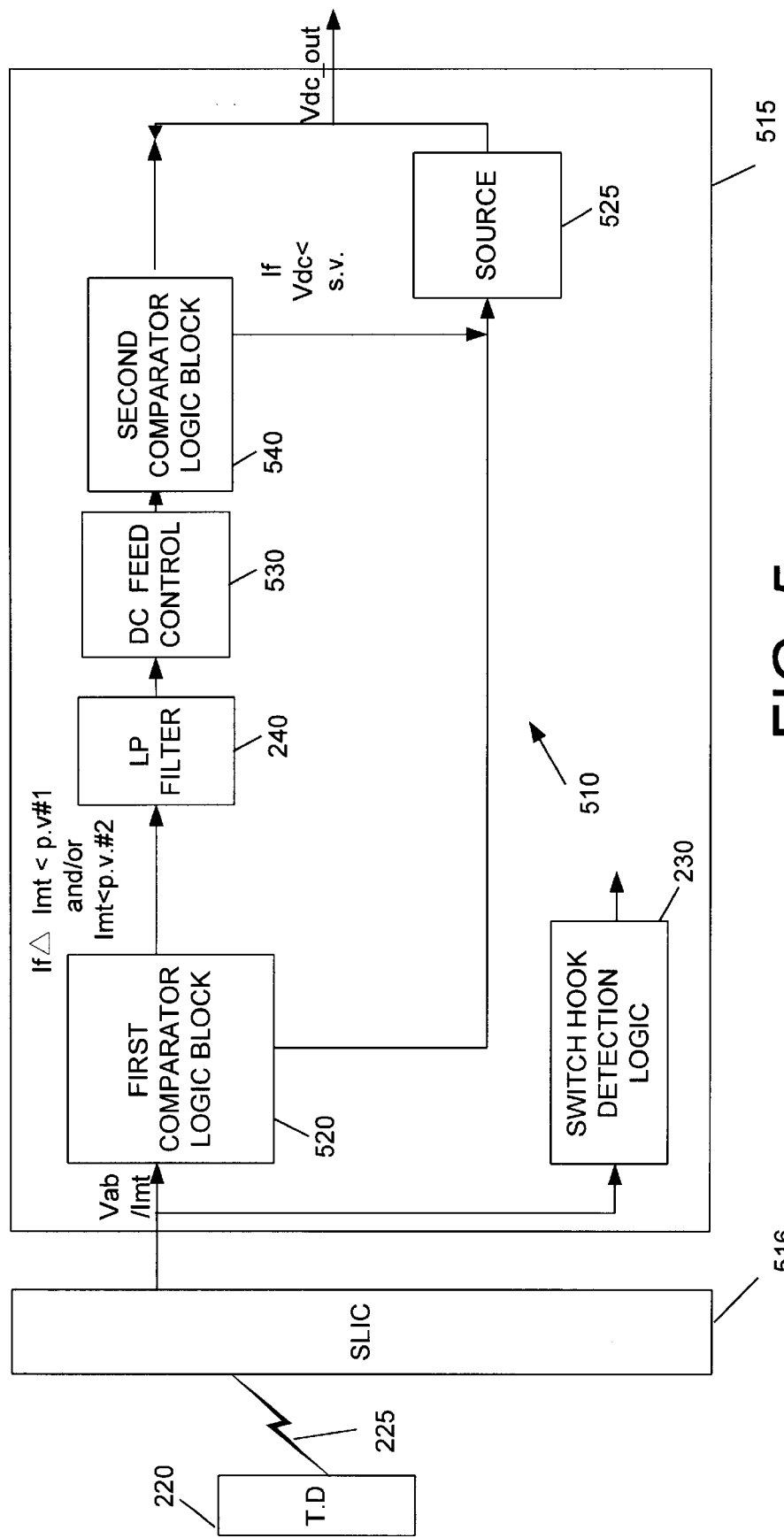
FIG. 5 depicts a block diagram of an alternative embodiment of an apparatus in accordance with the present invention that may be implemented in the communications system of FIG. 1.

The SLIC 221 illustrated in FIG. 2 is a current-feed SLIC in which a current is fed to the subscriber loop and a resulting voltage is measured. It is contemplated that the apparatus 210 of the instant invention may also be employed in conjunction with a voltage-feed SLIC as well, wherein the measured electrical parameter is the loop current after applying a voltage. FIG. 5 illustrates an exemplary voltage-feed SLIC system in accordance with the present invention.

Referring back to FIG. 2, the apparatus 210 of the instant invention includes a first comparator logic block 235 that receives the voltage input signal ($V_{ab}$) from the tip and ring terminals (not shown) of the SLIC 221. The $V_{ab}$ signal is the voltage measured between the trip and ring terminals of the subscriber line 225. Depending on the value of $V_{ab}$ or the change in $V_{ab}$, the first comparator logic block 235 provides a signal to either a low pass filter 240 or a current source 245. The current source 245 is capable of providing current of a first preselected value. Although not so limited, in the illustrated embodiment, the current source 245 provides 1 mA to the loop. The low pass filter 240 removes substantially all high frequencies and provides a DC signal to a DC feed control 247.

Figure 3:
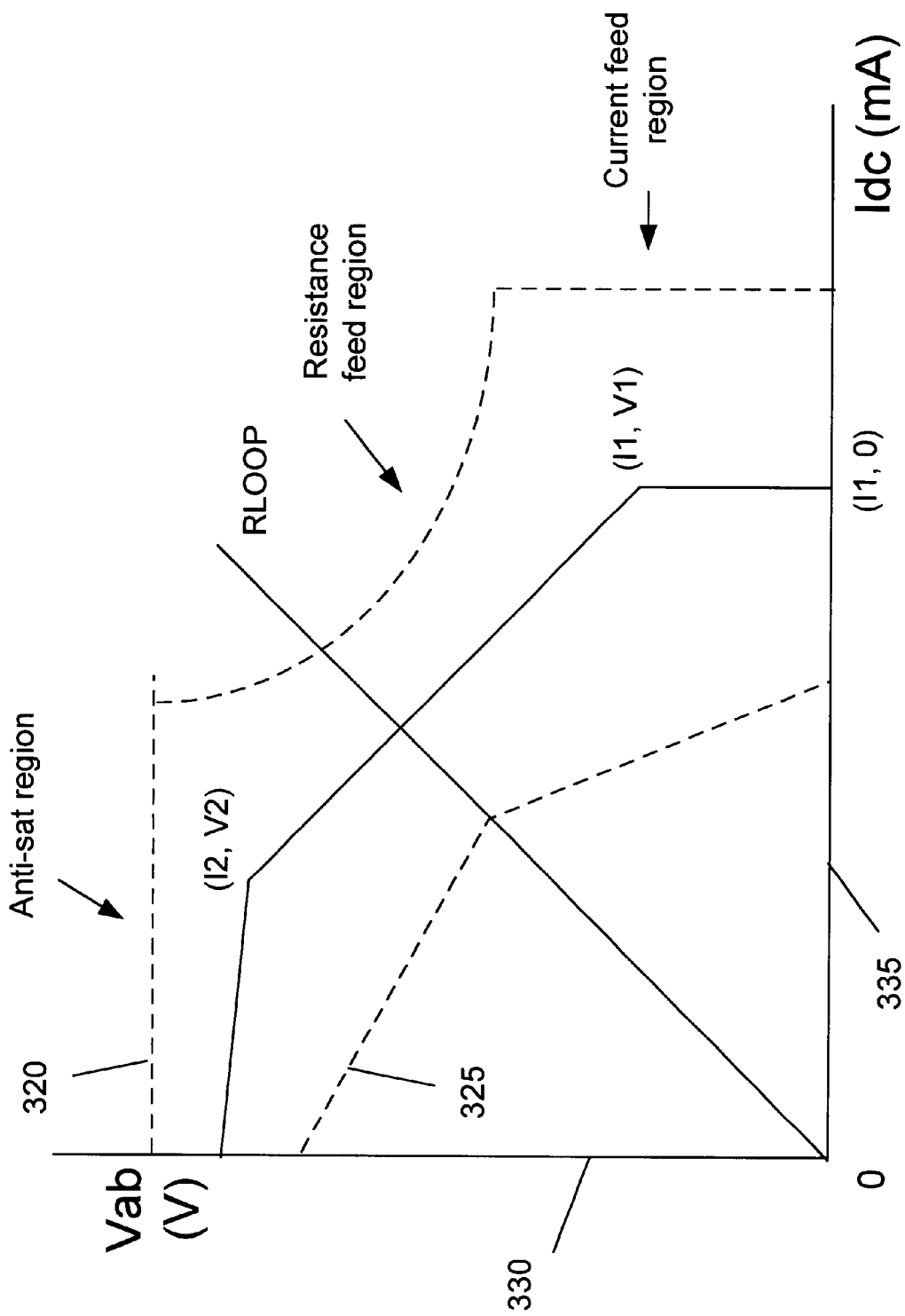
FIG. 3 depicts an exemplary DC feed curve that may be employed by the apparatus of FIG. 2.

The DC feed control 247 delivers adequate power to the loop by adjusting the current, $I_{dc}$, in response to the input signal. FIG. 3 illustrates an exemplary DC feed curve that may be adapted for use by the DC feed control 247. A dashed line 320 provides the upper limits for the electrical power, and a dashed line 325 provides the lower limits the electrical power provided to the subscriber loop. A Y-axis 330 represents voltage, and an X-axis 335 represents current. As can be seen in FIG. 3, although not so limited, the DC feed curve includes an anti-saturation region, a resistance feed region, and current feed region.

The DC feed control 247 adjusts the level of the current needed for operation in response to the received voltage, $V_{ab}$. The DC feed control 247 is not described in detail herein, as it may be implemented in a variety of ways by those of ordinary skill in the art having the benefit of this disclosure. The DC feed control 247 provides $I_{dc}$ current to a second comparator logic block 250 that determines if $I_{dc}$ current is less than a preselected threshold value, such as 1 mA, for example. The preselected threshold value may be any value that is sufficient to keep the subscriber loop operational. In the instant embodiment, the preselected threshold value is 1 mA. If $I_{dc}$ current is less than the preselected threshold value, the current source 245 provides current of the first preselected value (i.e., 1 mA in the instant embodiment) to the loop. If $I_{dc}$ current is greater than the preselected threshold value, then the $I_{dc}$ current is provided to the subscriber loop.

Figure 4:
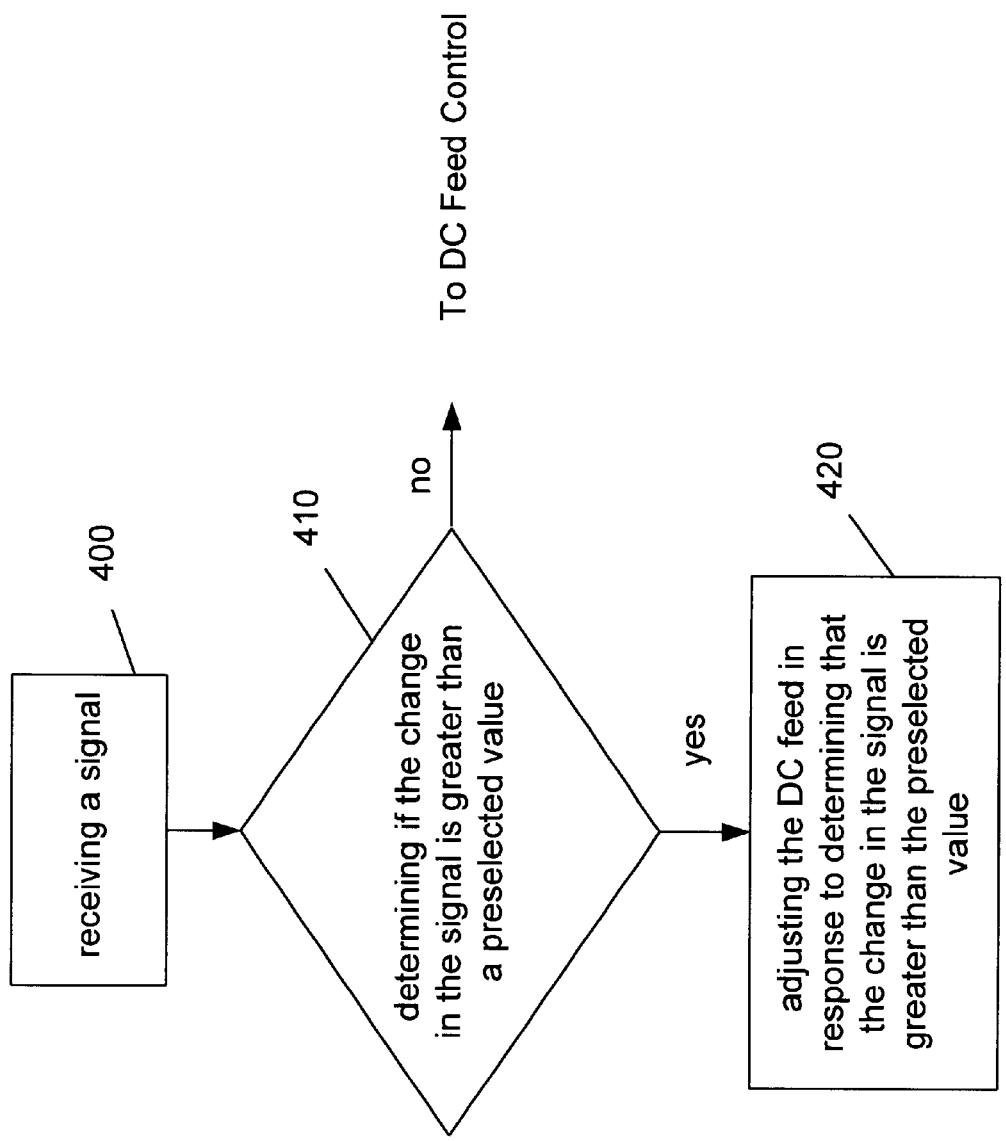
FIG. 4 illustrates a method in accordance with the present invention that may be implemented by the apparatus of FIG. 2.

FIG. 4 illustrates a method in accordance with the present invention that may be employed by the apparatus 210 of FIG. 2. The method of FIG. 4 begins at block 400, where the first comparator logic block 235 receives a signal from subscriber line 225. In the illustrated embodiment, the first comparator logic block 235 receives the signal $V_{ab}$ from the subscriber line 225. At block 410, the first comparator logic block 235 determines if the change in the $V_{ab}$ signal is greater than a preselected voltage value, wherein the preselected voltage value is a value that indicates a possible change in the switch-hook state of the telephonic device 220. In the instant invention, since the SLAC 215 interfaces with the current-feed SLIC 221, a change in $V_{ab}$ signal may be utilized to determine a possible change in the switch-hook state of the telephonic device 220. As such, the preselected voltage value, for example, may be approximately 5 to 10 percent of the battery voltage applied to the subscriber line 225. Thus, if DC voltage applied to the subscriber line 225 is 50 volts, the preselected voltage value may be 2.5 to 5 volts. In an alternative embodiment, the first comparator logic block 235 may also determine if the $V_{ab}$ signal is greater than a second preselected voltage value, where the second preselected voltage value is an indication that the telephonic device 220 has gone on-hook. In the current-feed SLAC 215 of FIG. 2, one indication that the telephonic device 220 has gone on-hook is the presence of relatively high voltage level in the signal from the subscriber line 225. Accordingly, the second preselected voltage value, in one embodiment, may be "V2," as identified in the DC feed curve of FIG. 3. The second preselected voltage value may also be a variety of other voltage values, including the voltage range in the anti-saturation region of the DC feed curve.

Referring back to the method of FIG. 4, at block 420, the current source 245 adjusts the DC feed to the subscriber loop in response to determining that the change in the $V_{ab}$ signal is greater than the first preselected voltage value (5–10% of battery voltage, in the instant embodiment). One way the current source 245 adjusts the DC feed is by providing a relatively low current to the subscriber loop to remove the subscriber loop from a saturation condition. Any of a variety of relatively low current levels can be provided by the current source 245 without departing from the spirit of the instant invention. In the illustrated embodiment, the current source 245 provides about 1 mA current. In an alternative embodiment, the current source 245 adjusts the DC feed to the subscriber loop in response to determining that the change in the $V_{ab}$ signal is greater than the preselected voltage value (e.g., 5–10% of the battery voltage in the instant embodiment) and in response to determining that $V_{ab}$ is greater than the second preselected voltage value (e.g., "V2"). A change in $V_{ab}$, combined with the fact that $V_{ab}$ is greater than the second preselected voltage value, is an indication that the driver (not shown) of the SLIC 221 may be in saturation. Accordingly, the current source 245 provides a current of a preselected value (e.g., 1 mA current in the instant invention) to the subscriber loop to recover from the saturation condition.

FIG. 5 illustrates an alternative embodiment of an apparatus 510 in accordance with the present invention. In the illustrated embodiment, the host transceiver 105 is a SLAC 515 that is coupled to the telephonic device 220 through a current-feed SLIC 516. The low-pass filter 240 and the switch hook detection logic block 230 are similar to the ones employed in the current-feed SLAC 215 of FIG. 2, as indicated by the like numbering. The apparatus 510 includes a first comparator logic 520 block that receives a current input signal ($I_{mt}$) from the subscriber line 225 via the SLIC 516. Depending on the value of $I_{mt}$ current, or the change in $I_{mt}$ current, the first comparator logic block 520 provides a signal to either the low pass filter 240 or a voltage source 525. The voltage source 525 is capable of providing voltage of a preselected value to the subscriber loop. The low pass filter 240 removes substantially all high frequencies and provides a DC signal to a DC feed control 530.

The DC feed control 530, based on the input signal, delivers adequate power to the loop by adjusting the voltage provided to the subscriber loop. FIG. 3 illustrates an exemplary DC feed curve that may be adapted for use by the DC feed control 530. The DC feed control 530 adjusts the level of the voltage needed for operation in response to the received current, $I_{mt}$. The DC feed control 530 provides a voltage signal to a second comparator logic block 540 that determines if the voltage level is less than a preselected threshold value. The preselected threshold value may be any value that is sufficient to keep the subscriber loop operational. If the voltage level of the signal from the DC feed control 530 is less than the preselected threshold value, the voltage source 525 provides voltage of the preselected value to the loop. If voltage level of the signal from the DC feed control 530 is greater than the preselected value, then the signal from the DC feed control 530 is provided to the subscriber loop.

Although the method of FIG. 4 is described with respect to the SLAC 215 of FIG. 2, it is contemplated that the method of the instant mention may be equally applicable to the SLAC 515 that interfaces with the voltage-feed SLIC 516, as that shown in FIG. 5. At the block 400, the first comparator logic block 520 receives a signal ($I_{mt}$) from subscriber line 225 via the SLIC 516. At block 410, the first comparator logic block 520 determines if the change in the $I_{mt}$ signal is less than a preselected current value, wherein the preselected current value may be a value that indicates a possible change in the switch-hook state of the telephonic device 220. Because the SLAC 515 interfaces with a voltage-feed SLIC 516, a change in the current ($I_{mt}$) of the signal from the subscriber line 225 may be utilized to determine a possible change in the switch-hook state of the telephonic device 220. As such, the preselected current value, for example, may be approximately 5 to 10 percent of the DC current applied to the subscriber line 225. The first comparator logic block 520 may also, in an alternative embodiment, determine if the $I_{mt}$ current is greater than a second preselected current value, wherein the second preselected current value is an indication that the telephonic device 220 has gone on-hook. One indication that the telephonic device 220 in FIG. 5 has gone on-hook is a relatively low level of current flowing from the subscriber line.

At the block 430, the source 525 adjusts the DC feed in response to determining that the $I_{mt}$ change in the signal is greater than the preselected current value. One way the source 525 adjusts the DC feed is by providing a relatively high voltage to the subscriber loop to remove a driver (not shown) of the SLIC 516 from a saturation condition. In alternative embodiment, the current source 525 adjusts the DC feed in response to determining that the change in the $I_{mt}$ signal is greater than the preselected current value (e.g., 5–10% of applied DC current) and in response to determining that $I_{mt}$ is smaller than the second preselected value. A change in the $I_{mt}$, combined with the fact that $I_{mt}$ is smaller than the second preselected value, is an indication that the driver (not shown) of the SLIC 516 is in saturation. Accordingly, the source 525 provides a voltage of preselected value to the subscriber loop to recover from a saturation condition.

The method of FIG. 4 allows the host transceiver 105 to expeditiously recover from a saturation condition (i.e., non-linear state) to a non-saturation condition. Recovering from a saturation condition expeditiously is desirable during switch-hook detection since many telephone systems determine the on-hook or off-hook state of the telephonic device 220 based on the measured loop impedance, which in turn is calculated based on measured voltage and current from the subscriber loop. And since Ohms Law is generally applicable for measuring loop impedance in linear systems, it is desirable to remove the subscriber loop from a saturation condition before an accurate impedance level may be detected.

One instance where the subscriber loop goes into saturation mode is during a transition from off-hook to on-hook state. A transition from an off-hook to on-hook state may occur when a user terminates telephone service by engaging the switch hook, or when the telephonic device 220 employs pulse dialing, which generally comprises pulses generated by a sequence of on-hook/off-hook states. The present invention allows for an expedient way of detecting the switch-hook state of the telephonic device 220 by restoring the system to a non-saturation state, such that the loop impedance can be readily detected.

Those skilled in the art having the benefit of this disclosure will appreciate that the method of the instant invention may be implemented in software, hardware, or a combination thereof. Additionally, the comparator logic blocks (235, 250—see FIG. 2; 520–540—see FIG. 5), filter 240, sources (245—see FIG. 2; 520—see FIG. 5) and switch hook detection logic 230 may be implemented by those skilled in the art having the benefit of this disclosure using a variety of available components. The SLAC features illustrated in FIG. 2 and FIG. 5 may be implemented within a digital signal processor.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus comprising
    a subscriber line interface circuit capable of interfacing with a transceiver over a connection; and
    a subscriber line audio-processing circuit coupled to the subscriber line interface circuit, the subscriber line audio-processing circuit including:
        a first logic adapted to receive a signal over the connection and to determine if a change in the signal is greater than a first preselected value and to determine if a value of the signal is greater than a second preselected value; and
        a second logic for adjusting the DC feed to the connection in response to determining that the change in the signal is greater than the first preselected value and that the value of the signal is greater than the second preselected value,
    wherein the subscriber line audio-processing circuit further includes logic for detecting switch-hook of the transceiver in response to adjusting the DC feed.

2. The apparatus of claim 1, wherein the subscriber line audio-processing circuit further includes logic for measuring an impedance of the connection.

3. The apparatus of claim 2, wherein the connection is a subscriber line coupled to central office through a ring and tip terminal, and wherein the first logic receives the signal representative of a voltage level.

4. An apparatus for detecting a switch-hook state of a user transceiver, comprising:
    means for receiving a signal from a connection;
    means for determining if a change in the signal is greater than a first preselected value;
    means for determining if a value of the signal is greater than a second preselected value;
    means for adjusting the DC feed in response to determining that the change in the signal is greater than the first preselected value and the value of the signal is greater than the second preselected value; and
    switch hook detection logic capable of detecting switch-hook of the user transceiver in response to adjusting the DC feed.

5. The apparatus of claim 4, wherein the means for adjusting the DC feed includes means for providing current of a third preselected value to the connection in response to determining that the signal is greater than the second preselected value.

6. The apparatus of claim 5, wherein the connection is a subscriber loop having a tip and ring terminal, wherein means for determining includes means for determining if the change in the voltage between the ring and tip terminals is greater than the first preselected value.

7. The apparatus of claim 6, wherein the subscriber line is supplied with a preselected voltage, wherein the first preselected value is substantially ten percent of the preselected voltage.

8. A method for adjusting DC feed control of a connection, comprising:
    receiving a signal from the connection;
    monitoring for a change in the signal;
    determining if the change in the signal is greater than a first preselected value;
    determining if a value of the signal is greater than a second preselected value; and
    adjusting the DC feed in response to determining that the change in the signal is greater than the first preselected value and determining if the value of the signal is greater than the second preselected value,
    further including detecting switch-hook of a transceiver in response to adjusting the DC feed.

9. The method of claim 8, wherein the connection is a subscriber line coupled to central office through a ring and tip terminal, wherein receiving a signal includes receiving the signal representative of a current level.

10. The method of claim 8, further including providing current of at least a selected value to the connection in response to determining that the change in the signal is less than the first preselected value.

11. The method of claim 10, wherein adjusting the DC feed further includes providing current of a third preselected value to the connection in response to determining if the signal is greater than the second preselected value.

12. The method of claim 11, wherein the third preselected value of current is substantially 1 mA.

13. The method of claim 11, wherein the connection is a subscriber line coupled to central office through a ring and tip terminal, wherein receiving a signal includes receiving the signal representative of a voltage level.

14. The method of claim 13, wherein the second preselected value comprises a voltage value substantially in the anti-saturation region.

15. The method of claim 14, wherein determining if the change in the signal is greater than a first selected signal includes determining if the change in the voltage between the ring and tip terminals is greater than the first preselected value.

16. The method of claim 15, wherein the subscriber line is supplied with a preselected voltage, wherein the first preselected value is substantially ten percent of the preselected voltage.

17. The method of claim 16, wherein the first preselected value is substantially five volts.

18. An apparatus for adjusting DC feed control of a connection, comprising:

comparator logic adapted to receive a signal from the connection and to determine if a change in the signal is greater than a first a preselected value and if a value of the signal is greater than a second preselected value; and circuitry for adjusting the DC feed in response to determining that the change in the signal is greater than the first preselected value and in response to determining that the value of the signal is greater than the second preselected value, wherein the circuitry is capable providing current of at least a selected value in response to determining that the change in the signal is less than the first preselected value, and further including detecting switch-hook of the apparatus in response to adjusting the DC feed.

19. The apparatus of claim 18, wherein the circuitry for adjusting the DC feed includes providing current of a third preselected value to the connection in response to determining that the signal is greater than the second preselected value.

20. The apparatus of claim 19, wherein the connection is a subscriber line coupled to central office through a ring and tip terminal, wherein the comparator logic receives a signal representative of a voltage level.

21. The apparatus of claim 20, wherein the comparator logic is capable of determining if the change in the voltage between the ring and tip terminals is greater than the first preselected value.

22. The apparatus of claim 21, wherein the subscriber line is supplied with a preselected voltage, wherein the first preselected value is substantially ten percent of the preselected voltage.

23. The apparatus of claim 21, wherein the second preselected value comprises a voltage value substantially in the anti-saturation region.

* * * * *

UNITED STATES PATENT AND TRADEMARK OFFICE
CERTIFICATE OF CORRECTION

PATENT NO. : 6,671,373 B1 Page 1 of 1
DATED : December 30, 2003
INVENTOR(S) : Liguang Pang and Yang Zhou It is certified that error appears in the above-identified patent and that said Letters Patent is hereby corrected as shown below:

<u>Column 9,</u>
Line 29, replace "a first a" with -- a first --.

Signed and Sealed this

Sixteenth Day of March, 2004

JON W. DUDAS
*Acting Director of the United States Patent and Trademark Office*